April 18, 1961 E. E. SIVACEK 2,980,875
THERMO-RESPONSIVE DEVICE
Filed Aug. 20, 1956
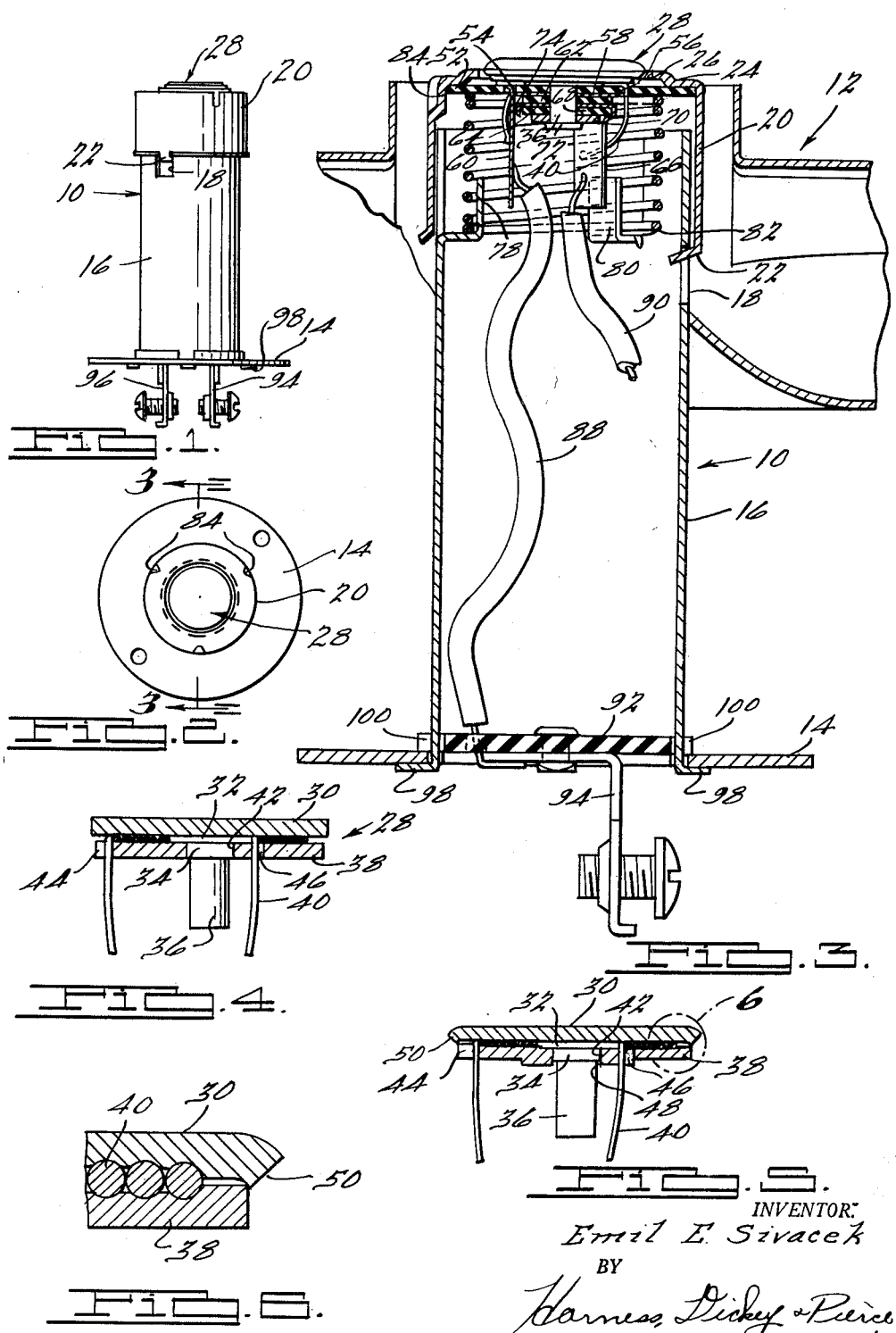
INVENTOR.
Emil E. Sivacek
BY
Harness, Dickey & Pierce.
ATTORNEYS United States Patent Office 2,980,875
Patented Apr. 18, 1961

2,980,875

THERMO-RESPONSIVE DEVICE

Emil E. Sivacek, Ann Arbor, Mich., assignor to King-Seeley Corporation, Ann Arbor, Mich., a corporation of Michigan Filed Aug. 20, 1956, Ser. No. 604,917

22 Claims. (Cl. 338—25)

This invention relates to temperature sensing and more particularly to transducing devices for reflecting changes of experienced temperature into corresponding variations in a characteristic of the device.

The accuracy which can be feasibly achieved in the measurement or control of the temperature of a body or mass is determined by a number of characteristics of the temperature sensing device. First, the device should be highly sensitive, manifesting a large change in its output characteristic in response to a minute change in its temperature. For example, the fluid employed in hydraulic or pneumatic sensing devices should have a high coefficient of thermal expansion, and the polymetallic elements employed in certain mechanical sensing devices should reflect a small temperatre change in a significant physical movement. Desirably, the relationship between the sensed temperature and the magnitude of the output characteristic of the sensor should be rectilinear to facilitate indication and control. The device should be mechanically rugged and must be capable of withstanding any temperatures within the range it is expected to sense. As an element of the requirement for high sensitivity, the thermal inertia of the sensor should be very low, its output characteristic should change effectively instantaneously any change in temperature of the body or mass. The sensor should, at least in many applications, also possess a high degree of selectivity, that is, it should be so constructed and disposed as to sense only the temperature of the designated body or mass.

Refined techniques have been devised for improving the sensitivity of substantially all types of sensing devices, the intimacy of heat transfer relationship between the sensor and the body, and the shielding of the sensor from extraneous heat sources. It has previously been appreciated that an electrical resistance element having a high positive or negative coefficient of resistance is well adapted for use as a sensing element, being compact and sensitive and having an output characteristic that can be readily translated for indication or control purposes. A number of patents suggest the use of high negative coefficient of resistance elements as sensers and teach various constructions and mountings for those elements. Others have concluded that the rectilinearity of the output characteristic and the stability of the unit even at relatively high sensed temperatures recommends sensing resistors having a high positive temperature coefficient of resistance, representative arrangements being illustrated in Patent 1,446,880, granted February 27, 1923, to O. A. Colby, in Patent 2,163,297, granted June 20, 1939, to A. H. Waage, in Patent 2,207,871, granted July 16, 1940, to J. W. Myers, in Patent 2,236,624, granted April 1, 1941, to L. F. Littwin, in Patent 2,552,480, granted May 8, 1951, to J. W. Dickey, in Patent 2,463,984, granted March 8, 1949, to K. M. Lederer, in Patent 2,686,250, granted August 10, 1954, to G. W. Schroeder and in other prior art disclosures.

The principles of the present invention are embodied in the latter type of sensing element. While a number of high positive temperature coefficient of resistance senser elements in the art have possessed a number of desirable characteristics, the unit disclosed as the representative embodiment of the present invention is believed to meet the foregoing requirements and others to a substantially improved degree. Since one of the significant advantages of the disclosed arrangement lies in its selectivity, in its capability of being effectively non-responsive to extraneous heat sources, the sensing unit is disclosed in an arrangement adapted to sense the temperature of a pan or pot disposed upon a stove surface heating unit. A number of prior art arrangements, while well suited for employment where the sensitivity requirements are low, where the senser is not subjected to extraneous sources of heat, or where the temperatures to which the senser will be subjected are relatively low, are neither designed nor adapted nor suitable for use in connection with a stove surface unit.

In general, the disclosed device comprises a pellet mountable in the central cavity in a stove surface unit and having a relatively large upper surface area to provide accurate sensing of the temperature of the pot or pan but being sufficiently thin so that the amount of sensing area subjected to direct heat from the surface unit is very small. The pellet is flexibly supported so that it protrudes above the plane of the surface unit in a position to be engaged by the pan and deflected downwardly by the weight of the pan, thereby insuring intimate heat transfer relationship between the pan and the senser. The senser resistance itself is effectively sealed within a metal canister so that the senser itself cannot readily become wet, dirty or damaged.

In the preferred form of sensing pellet, the wire is in the form of a planar spiral sandwiched between and embedded in one or both of a pair of relatively thin plates, the ends of the wire extending through notches or apertures in the lower of the two plates. In constructing the device, the wire is wound on an arbor and in a single layer between the two plates. After winding, the plates are pressed together under great force until portions of their adjacent surfaces lie substantially in a common plane. Additionally, the arbor itself becomes integrally embedded in at least one of the plates and an extension on that arbor serves not only as a further means for securing the plates together but also acts as a supporting element for the output terminal structure and for certain additional elements which are provided to facilitate mounting of the senser.

A suitable system with which the disclosed senser may be associated is disclosed in the patent application of George B. Whinery, Serial No. 604,867, filed August 20, 1957, filed on even date herewith and entitled Thermo-Responsive System. The nature of the invention will be more clearly understood from the following description of a representative embodiment of the invention and of the method of manufacture thereof, when read with reference to the accompanying drawings in which:

Figure 1 is a front elevational view of a sensing unit embodying the principles of the present invention;

Fig. 2 is a top plan view of the sensing structure shown in Fig. 1;

Fig. 3 is a sectional view taken substantially along the line 3—3 of Fig. 2, and illustrates a representative relationship between the sensing unit and a stove surface heating unit;

Fig. 4 is a sectional view of the sensing pellet during the course of its manufacture;

Fig. 5 is a sectional view of the sensing pellet after the two major constituent plates thereof have been pressed together; and Fig. 6 is an enlarged view of the portion within the circle 6 on Fig. 5.

The senser 10 is designed to be disposed within the central opening of an electrical resistance type of stove surface heating unit 12, the senser being supported within that unit by means of an integral mounting plate 14 bolted or otherwise secured to the range or stove structure.

Senser 10 comprises a tubular housing 16 having, near its upper end, three peripherally spaced slots 18. A generally tubular cap 20, telescoped over the upper end of the housing 16, is provided with three spaced-apart retaining tabs 22 depending from its lower edge and bent inwardly to engage the corresponding slots 18. The clearance between the inner diameter of cap 20 and the outer diameter of housing 16 is sufficient to permit free relative sliding motion, the upper surface of retaining tabs 22 serving as a limit stop to upward motion of cap or movable member 20 relative to housing or support member 16 and, if desired, the lower surface of those tabs serving as a limit stop to the downward motion of cap 20 relative to housing 16.

The upper end of the cap 20 is partially closed by a stepped flange 24 defining a central aperture 26. A sensing pellet 28 is resiliently supported centrally of the aperture 26.

As may most clearly be seen in Figs. 4 and 5 of the drawings, sensing pellet 28 comprises a top plate or arbor head 30, an arbor means or body 32, an arbor shoulder 34, an arbor shank 36, a backing plate or disk 38 and a resistance wire 40.

Sensing wire 40 is a fine, insulated wire having a substantial temperature coefficient of resistance. Excellent results have been achieved by employing a nickel-iron alloy wire having a temperature coefficient of resistance of 0.0045 ohm per ohm per degree centigrade measured at 68° F. The tested wire was approximately number 38 B & S gauge wire drawn to a resistance of about 8 ohms per foot at 68° F. The specific resistance of the tested wire was about 120 ohms per circular mil foot at 68° F., and, in the tested embodiment of the invention, the length of that wire was selected to provide a resistance at 68° F. of about 10 ohms, that resistance value rising to approximately 20 ohms at 450° F.

Since wire 40 is disposed in a series of abutting turns and is in abutting relation with metallic elements, it must be insulated and the insulation must be of a type which will maintain its integrity under the mechanical and thermal stresses to which the wire is subjected during manufacture and use. The most satisfactory insulation which has as yet been tested is a double glass insulation applied, with a binder, over the annealed and enameled wire. The insulated wire, as a representative specific example, may have a diameter or preselected initial thickness in the order of 0.011 inch.

In the illustrated arrangement the arbor 32 is in the form of a disk formed integrally with top plate 30, arbor shoulder 34 is in the form of a disk of smaller diameter than arbor 32 and formed integrally therewith, whereas shank 36 is of still further reduced diameter and is formed integrally with shoulder 34. Backing plate 38 is provided with a central aperture 42 adapted to accept the arbor shoulder portion 34. As representative specific examples of appropriate sizes of these elements, the cylindrical top plate 30 may be in the order of 17/32 of an inch in diameter and 1/32 of an inch thick, backing plate 38 is the same in thickness as plate 30 and is desirably slightly smaller in diameter, such as 1/2 of an inch in diameter. The thickness of arbor 32 is preferably about the same as the thickness of the insulated wire 40. As will be seen, it is highly advantageous from an assembly standpoint that arbor 32 be no thinner than insulated wire 40 and, conversely, that it be sufficiently thin so that a single-layer winding of wire 40 is insured. In practice, it is preferred to form arbor 32 about 0.001 to 0.003 inch thicker than the diameter of insulated wire 40. The thickness of arbor shoulder 34 is representatively identical to the thickness of washer or backing plate 38 and the aperture 42 in plate 38 is preferably only enough larger than shoulder 34 to permit that plate to be slipped over the shoulder 34 without the necessity of exerting any substantial force.

Backing plate or washer 38 is provided, at one point in its periphery, with a notch or slot 44 sufficiently large to accept the wire 40. While an aperture spaced from the edge of plate 38 will function as a satisfactory equivalent, the provision of a notch facilitates assembly, as will be noted. In practice, notch 44 is about 1/32" wide and extends radially inwardly about the same distance. Plate 38 is additionally provided with an aperture 46 representatively disposed on a diameter with notch 44. Aperture 46 is sufficiently large so that wire 40 may be readily passed therethrough and is so radially located that wire 40, when passing therethrough, will be approximately aligned with a point on the periphery of arbor body 32. In a practical embodiment, aperture 46 was made about three times the diameter of insulated wire 40 and was so located that its innermost edge was approximately in line with the edge of arbor 32. With the foregoing sizes, this may be accomplished by drilling a 1/32" diameter hole centered 7/64" from the center of plate 38.

In assembling the unit, the end of wire 40 is inserted through the aperture 46 in the washer or backing plate 38 and the washer is then inserted over shank 36 and seated upon shoulder 34 in abutment with the face of arbor body 32, the free end of the wire extending in the direction of the shank. The spool of wire and the assembled plates and arbor are then rotated relative to one another about the longitudinal axis of the shank 36 either by fixing shank 36 against rotation and moving the wire in a circular path or by rotating the shank 36 and hence the arbor 32 about its longitudinal axis while feeding the wire from a fixed point. With the end of the wire 40 restrained against movement through aperture 46, and with the portion of the wire adjacent that aperture but between the plates 30 and 38 lying against the peripheral surface of arbor 32, this relative rotational motion will cause the wire to be spiralled in a single layer coil as illustrated, the coil building up between the adjacent surfaces of the plates 30 and 38. The position of notch 44 and the diameter of arbor 32 are selected so that when the arbor assembly has been filled to the indicated level and the wire brought through the notch 44, the proper length of wire will have been emplaced. When the wire 40 has been severed from the reel the assembled unit will appear as illustrated in Fig. 4 of the drawings.

The next step in manufacturing the senser pellet is to effectively seal the sensing wire between the plates 30 and 38, establishing, in the process, an intimate heat exchange relationship between those plates and the senser wire. This is accomplished by placing the unit, as assembled in Fig. 4, in a press adapted to provide forces of substantial magnitude pressing plates 30 and 38 together. Desirably, but not imperatively, this compressing action is of sufficient magnitude to move portions of the adjacent surfaces of the plates 30 and 38 into engagement with one another. It has been found that if plates 30 and 38 are formed of proper materials the wire 40 may be physically embedded in one or both of the adjacent surfaces of those plates so that the area of engagement between the insulated wire surface and the plates will be substantial. One or both of the plates 30 and 38 are preferably formed of a material of sufficient ductility and softness to permit such embedding, such as selected grades of aluminum. It has been found that the insulation upon wire 40 will maintain its electrical integrity despite the mechanical and thermal stresses to which it is subjected whether it remains physically integral or whether it is fractured in minute particles during the compressing and embedding operation.

In the compressing operation, a die is preferably employed which will permit the central portion of plate 38 to be effectively extruded by arbor 32, producing the discontinuous lower surface or protuberance on plate 38 which is illustrated in Fig. 5 of the drawings.

To insure that the elements 30 and 38 will not become separated and will seal the sensor wire 40, the arbor shoulder 34 is staked as at 48. Additionally, either as a separate operation or as an element of the compressing operation, the edges of plate 30 are rolled over as at 50 to establish or insure a seal at the periphery of the pellet.

It will be observed that in the preferred arrangement, the pellet assembly comprises a resistance wire sandwiched between a headed arbor and a washer. Pellets have also been satisfactorily formed with top plate 30 and arbor 32 being separately manufactured and being screwed or otherwise interjoined as an element of the assembly operation.

The completed pellet or sandwich, as illustrated in Fig. 5, is then employed as an element of a terminal and support sub-assembly. Thus, a centrally apertured support disk or plate 52 (Fig. 3), which may be made, for example, of mica, is placed over shank 36 and in abutment with the backing plate 38, the ends of wire 40 being passed through appropriately positioned apertures 54 and 56 in that support plate.

A terminal strip or bus having an enlarged, circular, centrally apertured base portion 58 and a depending leg portion 60 is next placed upon shank 36, with the upper face of portion 58 abutting the lower face of support plate 52. One end of wire 40 is soldered or otherwise secured to this terminal strip. In the illustrated arrangement, the central aperture in portion 58 is approximately the same diameter as shank 36 so that the pellet plates 30 and 38 and shank 36 are electrically connected to one end of the sensing wire. This electrical interrelation may, of course, be readily avoided if it is undesirable from a circuit standpoint.

A flat insulating washer 62 is then placed upon shank 36 in abutment with terminal strip base portion 58 after which the base portion 64 of a second terminal strip including a depending leg portion 66 is placed upon shank 36. The other end of wire 40 is soldered or otherwise rendered electrically integral with depending leg 66. Insulating washer 68 and metallic washer 70 complete the terminal stack, with shank 36 being headed over as at 72 to integrate the assembly. The central aperture in terminal strip base portion 64 is substantially greater than the shank 36 to avoid an electrical connection therebetween. Centering of that aperture relative to the shank 36 is representatively insured by forming a peripheral skirt 74 on the base portion 64 engaging portions of the periphery of insulating washer 68.

Three offset projections including projections 78 and 80 are formed near the upper end of the housing 16 to define a spring seat centrally disposed within that housing and adapted to accept a compression spring 82 of smaller diameter than the diameter of the housing 16. The upper end of spring 82 bears against the lower surface of support plate 52, the upper surface of support plate 52 in turn bearing against the stepped flange partial end closure 24 of the cap 20. In the illustrated arrangement the upper ends of the side walls of cap 20 are lanced and deflected inwardly at three points to define three keying projections 84 adapted to be engaged by three corresponding peripherally spaced notches in the support plate 52.

Spring 82 therefore exerts a continuing force tending to move support plate 52, cap 20 and pellet 28 upwardly to the illustrated position which is established by the engagement between the retaining tabs 22 and the upper ends of the housing slots 18. In this position, the upper surface of pellet 28 should lie in a plane above that of the surface of the stove's heating unit to insure that a pot or pan placed upon that heating unit will engage the pellet 28 even though the undersurface of the pan or pot is non-planar. The force exerted by spring 82 is relatively small so that even the lightest pan expected to be placed upon the stove will be sufficiently heavy to move pellet 28 and cap 20 downwardly in order to permit portions of the bottom surface of the pot or pan to be in direct contact with the heating unit. Slots 18 in housing 10 are preferably substantially longer than the distance which the upper surface of sensing pellet 28 extends above the plane of the heating unit.

Insulated lead wires 88 and 90 are electrically secured to depending terminal strip portions 60 and 66, respectively. These wires pass through apertures in insulating terminal plate 92 and are soldered, welded or otherwise electrically secured to individual terminals 94 and 96, respectively, both of which are riveted or otherwise secured to terminal plate 92.

Terminal plate 92 is a disk having a diameter greater than the outside diameter of housing 16 and the major portion of the lower edge of that housing rests upon the upper surface of terminal plate 92. However, a plurality of peripherally-spaced depending tabs 98 are provided at the lower edge of housing 16 and these tabs 98 pass through correspondingly spaced notches 100 in the edge of terminal plate 92. Tabs 98 also pass through an enlarged central aperture in the generally annular metallic mounting plate 14 and are bent outwardly to effectively clamp terminal plate 92 and mounting plate 14 together.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a temperature sensing device, a pair of substantially parallel metal plates one of which has an aperture therein, a shank secured to the other one of said plates and extending through and beyond the aperture in said one plate, a shoulder on one of said plates having a diameter greater than the diameter of said shank and greater than the diameter of said aperture; and an insulated wire having a substantial temperature coefficient of resistance sandwiched between said plates and coiled around said shoulder, and means for securing said plates together.

2. In a temperature sensing device, a pair of substantially parallel metal plates one of which has an aperture therein, at least the edges of said plates being in intimate engagement, a shank integral with the other one of said plates and extending through and beyond the aperture therein, a shoulder on one of said plates having a diameter greater than the diameter of said shank and greater than the diameter of said aperture and an insulated wire having a substantial temperature coefficient of resistance sandwiched between said plates and coiled around said shoulder, and means comprising a portion of said shank beyond the aperture for securing said plates together.

3. In a temperature sensing device, a first plate having an integral protruding disk on one face thereof, a second plate adjacent said first plate and having an offset portion abutting said disk, and an insulated wire having a substantial temperature coefficient of resistance disposed around said disk and between said plates and at least partially embedded in at least one of said plates.

4. In a temperature sensing device, a first plate having a protruding disk centrally disposed on one face thereof, a second plate adjacent said first plate and having a centrally disposed offset portion abutting said disk and an opening aligned with the edge of said disk, and an insulated wire having a substantial temperature coefficient of resistance disposed around said disk and between said plates, one end of said wire extending through the opening in said one plate.

5. In a temperature sensing device, a first plate having a protruding disk centrally disposed on one face thereof, a second plate adjacent said first plate and having a centrally disposed offset portion abutting said disk and an opening aligned with the edge of said disk, and an insulated wire having a substantial temperature coefficient of resistance disposed around said disk and between said plates and at least partially embedded in at least one of said plates, one end of said wire extending through the opening in said one plate.

6. In a temperature sensing device, a sensing pellet comprising a pair of metal plates, an insulated wire having a substantial temperature coefficient of resistance sandwiched between said plates, a shank projecting from one of said plates, means for supporting said pellet comprising a housing, a centrally apertured cap slidably disposed upon said housing, means limiting movement of said cap relative to said housing in one direction, spring means tending to force said cap in said one direction, and an insulating disk secured on said shank and holding said pellet within the central aperture in said cap.

7. In a temperature sensing device, a sensing pellet comprising a pair of metal plates, an insulated wire having a substantial temperature coefficient of resistance sandwiched between said plates, a shank projecting from one of said plates, means for supporting said pellet comprising a housing, a centrally apertured cap slidably disposed upon said housing, means limiting movement of said cap relative to said housing in one direction, an insulating disk secured to said shank and engaging said cap, and compression spring means acting between said housing and said disk and tending to force said disk and said cap in said one direction, portions of said pellet lying within the central aperture in said cap.

8. A temperature sensing pellet comprising a washer having a first aperture centrally disposed therein, a second aperture adjacent the first aperture, and an edge slot, a headed arbor extending through the first aperture in said washer, and an insulated wire having a substantial temperature coefficient of resistance wound on said headed arbor and disposed between one surface of the head of said headed arbor and one surface of said washer, one end of said wire passing through the second aperture in said washer, the other end of said wire passing through said edge slot in said washer, said wire being at least partially embedded in at least one of said surfaces, said washer and arbor head being pressed into proximity to one another so that the spacing therebetween is less than the diameter of said wire, the edges of said arbor head and said washer being in engagement with one another.

9. In a temperature sensing device, a disc-like sensing element, and means for supporting said element comprising a housing, a centrally apertured cap slidably disposed upon said housing, means limiting movement of said cap relative to said housing in one direction, spring means tending to force said cap in said one direction, and an insulating disc secured to said element and holding said element within the central aperture in said cap.

10. The combination of claim 9 in which said element comprises a pair of metal plates and an insulated wire having a substantial positive temperature coefficient of resistance sandwiched between said plates.

11. The combination of claim 10 in which said element comprises a pair of metal plates and an insulated wire having a substantial positive temperature coefficient of resistance sandwiched between said plates and at least partially embedded in at least one of said plates.

12. In a temperature sensing device, a disc-like sensing element, and means for supporting said element comprising a housing, a cap having a side wall and a centrally apertured end slidably disposed upon said housing, means limiting movement of said cap relative to said housing in one direction, an enlarged disc secured to said element and disposed within said cap, and spring means acting between said housing and said disc and tending to force said disc and said cap in said one direction, portions of said element lying within the central aperture in said cap.

13. The combination of claim 12 in which said disc is an insulator and engages both the side wall of said cap and a portion of the inner face of said centrally apertured end.

14. The combination of claim 13 in which said cap and said disc are provided with mating peripheral irregularities to prevent rotation of said disc relative to said cap.

15. The combination of claim 13 in which said element comprises a pair of metal plates and an insulated wire having a substantial positive temperature coefficient of resistance sandwiched between said plates.

16. The combination of claim 15 in which said disc is mounted adjacent the lower face of the lower one of said plates, in which the thickness of said element is greater than the thickness of said end of said cap, and in which said cap is provided with an upwardly off-set heat shielding flange adjacent said aperture, the upper surface of said flange lying below the upper surface of the upper one of said plates.

17. In a temperature sensing device, first and second substantially parallel metal plates, a metallic wire having a substantial positive temperature coefficient of resistance disposed between said plates and at least partially embedded in said first plate, said wire being of harder metal than the metal of said first plate and having a diameter which is small relative to the thicknes of said first plate, means for electrically insulating the body of said wire from said plates, and a deflected peripheral edge portion on one of said plates engaging the other one of said plates.

18. In a temperature sensing device, first and second metallic plates, a metallic wire having a substantial positive temperature coefficient of resistance disposed between said plates, means for electrically insulating the body of said wire from said plates, a substantial portion of the facing faces of said plates being spaced apart a finite distance less than the diameter of said wire, and a deflected peripheral edge portion on one of said plates engaging the other one of said plates.

19. In a temperature sensing device, a pair of substantially parallel plates one of which has an aperture therein and the other one of which is of good heat conductive material and is disposable in intimate heat transfer relation with a mass the temperature of which is to be sensed, a shank secured to said other one of said plates and extending through and beyond the aperture in said one plate, arbor means between said plates having a diameter greater than the diameter of said shank and greater than the diameter of said aperture, an electrically insulated resistance wire of preselected thickness and having a substantial temperature coefficient of resistance sandwiched between said plates and coiled around said arbor means and receiving heat from the mass primarily through said other plate, and means for securing said plates together in abutment with said insulated wire and spaced apart in the region of said abutment with said insulated wire a distance less than said preselected thickness of said insulated resistance wire.

20. In a temperature sensing device, a thin disc-like sensing element including a plate and a resistor having a high temperature coefficient of resistance abutting said plate, and means for supporting said element comprising a support member, a centrally apertured movable member slidably supported upon said support member, means limiting movement of said movable member relative to said support member in one direction comprising laterally projecting stop means on one of said members engageable with a surface of the other one of said members, spring means tending to force said movable member in said one direction, and means including an insulating disc secured to said element and holding said element within the central aperture in said movable member and projecting slightly above said movable member.

21. The combination of claim 20 in which said element further includes a shank secured to said plate and projecting downwardly therefrom, in which said disc is secured to said shank below said plate, and in which forces supporting said shank and said plate and said resistor are exerted through said disc.

22. The combination of claim 20 in which said resistor is a wire having two terminal end portions, and further including means for electrically insulating at least the major portion of the body of said wire, a first conductor, first terminal means fixed to and disposed below said plate and electrically connected to one of said terminal end portions of said wire and to said first conductor, a second conductor, second terminal means fixed to and disposed below said plate and electrically connected to the other one of said terminal end portions of said wire and to said second conductor, and electrical insulation means for electrically insulating one of said terminal means from said plate and from the other one of said terminal means.

References Cited in the file of this patent
UNITED STATES PATENTS

| | | |
|---|---|---|
| 519,043 | Jenkins | May 1, 1894 |
| 1,112,788 | Gore | Oct. 6, 1914 |
| 1,218,205 | Packard | Mar. 6, 1917 |
| 1,663,810 | Morse | Mar. 27, 1928 |
| 2,207,871 | Myers | July 16, 1940 |
| 2,399,423 | Bletz | Apr. 30, 1946 |
| 2,430,196 | Vaughn | Nov. 4, 1947 |
| 2,484,585 | Quinn | Oct. 11, 1949 |
| 2,492,404 | Streib | Dec. 27, 1949 |
| 2,584,717 | Albert | Feb. 5, 1952 |
| 2,699,487 | Turner | Jan. 11, 1955 |
| 2,769,074 | Dyckerhoff | Oct. 30, 1956 |
| 2,779,846 | Richards | Jan. 29, 1957 |

UNITED STATES PATENT OFFICE
CERTIFICATE OF CORRECTION

Patent No. 2,980,875 April 18, 1961

Emil E. Sivacek

It is hereby certified that error appears in the above numbered patent requiring correction and that the said Letters Patent should read as corrected below.

Column 1, line 29, for "temperatre" read -- temperature --; column 7, line 60, for the claim referrence numeral "10" read -- 9 --; column 8, line 26, for "thicknes" read -- thickness --.

Signed and sealed this 10th day of October 1961.

(SEAL)
Attest:

ERNEST W. SWIDER
Attesting Officer

DAVID L. LADD
Commissioner of Patents

USCOMM-DC